(12) United States Patent
Rosmarin

(10) Patent No.: US 8,512,199 B2
(45) Date of Patent: Aug. 20, 2013

(54) MINIMIZING BACKLASH UTILIZING SERIES ELASTIC ELEMENTS

(75) Inventor: Josiah Rosmarin, Cambridge, MA (US)

(73) Assignee: Rethink Robotics, Inc., Boston, MA (US)

( * ) Notice: Subject to any disclaimer, the term of this patent is extended or adjusted under 35 U.S.C. 154(b) by 385 days.

(21) Appl. No.: 12/843,540

(22) Filed: Jul. 26, 2010

(65) Prior Publication Data

US 2012/0021867 A1   Jan. 26, 2012

(51) Int. Cl.
*F16H 57/08* (2006.01)
*F16H 55/18* (2006.01)

(52) U.S. Cl.
USPC ............................... 475/331; 74/409; 74/440

(58) Field of Classification Search
USPC ........................................................ 475/440
See application file for complete search history.

(56) References Cited

U.S. PATENT DOCUMENTS

| | | | |
|---|---|---|---|
| 3,665,482 A | 5/1972 | Cresswell | |
| 4,189,951 A | 2/1980 | Sauter | |
| 4,528,862 A | 7/1985 | Goldowsky | |
| 4,550,626 A | 11/1985 | Brouwer | |
| 4,714,388 A | 12/1987 | Siler | |
| 4,739,670 A | 4/1988 | Tomita et al. | |
| 5,517,874 A | 5/1996 | Janiszewski | |
| 5,540,630 A * | 7/1996 | Vranish .......................... 475/338 |
| 5,650,704 A | 7/1997 | Pratt et al. | |
| 5,910,720 A | 6/1999 | Williamson et al. | |
| 6,148,684 A | 11/2000 | Gardiner | |
| 6,258,002 B1 | 7/2001 | Lippitsch | |
| 6,997,076 B2 | 2/2006 | Menjak et al. | |
| 7,086,302 B2 | 8/2006 | Ask et al. | |
| 7,088,012 B2 | 8/2006 | Gizara | |
| 7,121,973 B2 | 10/2006 | Lumpkin et al. | |
| 7,191,675 B2 | 3/2007 | Ho | |
| 7,261,667 B2 | 8/2007 | Berger | |
| 7,605,488 B2 | 10/2009 | Rebsdorf | |
| 2002/0121152 A1 | 9/2002 | White et al. | |
| 2003/0015051 A1 | 1/2003 | Nomura et al. | |
| 2004/0089089 A1 | 5/2004 | Stevens et al. | |
| 2005/0284246 A1 * | 12/2005 | Faeth ............................... 74/409 |
| 2007/0179011 A1 * | 8/2007 | Choi et al. .................... 475/331 |
| 2007/0295136 A1 | 12/2007 | Fleming | |
| 2009/0314114 A1 | 12/2009 | Grosberg | |

FOREIGN PATENT DOCUMENTS

| | | |
|---|---|---|
| EP | 0355083 A1 | 2/1990 |
| EP | 0505140 A1 | 9/1992 |
| JP | 60040866 A | 3/1985 |
| WO | WO-2008/142131 A2 | 11/2008 |

* cited by examiner

*Primary Examiner* — Edwin A Young

(74) *Attorney, Agent, or Firm* — Bingham McCutchen LLP

(57) ABSTRACT

Certain embodiments of a system for reducing backlash include a mechanical input, a mechanical output, and first and second mechanical couplers each connected to the mechanical input and the mechanical output. An exemplary system includes an elastic element connected in series between the first mechanical coupler and the mechanical output to bias the first mechanical coupler in a first direction and an elastic element connected in series between the second mechanical coupler and the mechanical output to bias the second mechanical coupler in a second direction, where the second direction is opposite from the first direction.

18 Claims, 11 Drawing Sheets

MINIMIZING BACKLASH UTILIZING SERIES ELASTIC ELEMENTS

BACKGROUND

Mechanical couplings often require precision for applications in which the position of a machine is critical. For instance, mechanical precision in robotics is important for various purposes, for example, efficiency of mechanical components and accuracy of end-effector position. A common mechanical coupling in robotics utilizes gear couplings or gearboxes. Gearboxes can be particularly useful because electromagnetic transducers can deliver very low torques at very high speeds. In applications where bidirectional actuation with a gear reduction is necessary, however, backlash is a relevant concern.

Backlash is the amount of space between mating components of gears. By design, this space is built in to account for, inter alia, errors in gear manufacture and thermal expansion. In applications in which the gear couplings can be reversed, such as robotics, backlash of the mating components of the gears negatively affects the precision of the gear couplings. Moreover, robotic applications typically utilize gearboxes with multiple stages of gears. In such arrangements, backlash at each stage has a cascading effect, in that the gear ratio of each stage magnifies the backlash of the preceding stage. Therefore, in multi-stage gearboxes, the final stage of the gearbox is the most important for removing or reducing backlash, especially in applications in which the gear ratio of the final stage is large.

In standard gear trains, backlash is inevitable due to the over-constrained nature of gears. Care can be taken to significantly reduce backlash by tight tolerancing, but at significant cost. Other solutions to backlash have been developed. In one approach, harmonic drive gearboxes have no backlash, but are not resistant to shock loading, and are typically proprietary and expensive. In another approach, cycloidal gearboxes are another style of gearbox which remove backlash, and while they do not share the same durability issues as harmonic drives, they still tend to be proprietary and expensive.

In still another approach, anti-backlash gears are used. In application, an anti-backlash gear mates with a standard gear. A typical arrangement consists of two concentric gears, with one gear rigidly held to the shaft and the other gear coupled through a spring with a set pretension. The gear teeth of both anti-backlash gears sandwich the standard gear, and depending on the direction of force, independently act as the load path of the gear train. Even when the force is in the direction of the gear held by the spring, as long as the pretension is not overcome, the motion of the anti-backlash gear perfectly tracks the previous gear in the gear train, and there is no backlash. When the preload is overcome, however, the position of the anti-backlash gear becomes a function of the loading, the spring constant, and the preload, which has been viewed as an undesirable behavior.

Some applications can tolerate a compliant drive, and even some applications, such as series elastic actuators, require it. A typical approach in such applications is to find a gearbox with an appropriate level of backlash and an independent compliant system, and combine them. Although the gearboxes are chosen based on their relationship between input motion and output motion, the whole system behaves with an input motion and an output force.

SUMMARY OF THE INVENTION

What is needed, then, is a system for reducing or minimizing backlash that is cost-effective and durable. Generally, the invention relates to utilizing elastic elements to bias two separate mechanical couplers, which come from a single mechanical input, in opposite directions. The mechanical couplers can be separated and biased in opposite directions in any stage or in multiple stages of a multi-stage gearbox, including the final stage of a multi-stage gearbox. For example, the mechanical outputs can be rotatable output ring gears in a multi-stage planetary gearbox. The elastic elements connected to the output ring gears can follow along the entire rotational path of the output ring gears. In addition, the elastic elements can be connected in series to the output ring gears.

In one aspect, the invention relates to a system for reducing backlash. The system may include a mechanical input, a mechanical output, and first and second mechanical couplers. The system may include an elastic element connected in series between the first mechanical coupler and the mechanical output to bias the first mechanical coupler in a first direction and an elastic element connected in series between the second mechanical coupler and the mechanical output to bias the second mechanical coupler output in a second direction, where the second direction may be opposite from the first direction.

In various embodiments, the first mechanical coupler may be disposed adjacent to the second mechanical coupler. The first mechanical coupler and the second mechanical coupler may be gears in a stage of a multi-stage gear box. The first mechanical coupler and the second mechanical coupler may also be ring gears in a stage of a multi-stage planetary gearbox. The first mechanical coupler and the second mechanical coupler may be ring gears in a final stage of the multi-stage planetary gearbox. A gear ratio of the final stage may be 23:1. In some embodiments, the system includes a stationary center gear disposed between the first mechanical coupler and the second mechanical coupler; the stationary center gear may be fixed in position. The elastic elements may each be a torsion spring or a linear spring. The system may also include a force transducer positioned between the mechanical input and the mechanical output for generating a force signal indicating forces applied by one or all of the elastic elements. An active-feedback force controller may be connected between the force transducer and the mechanical input for controlling the mechanical input. Based on the force signal, the active-feedback force controller may deflect the elastic element by an amount that produces a desired output force.

In another aspect, the invention relates to a gear system for reducing backlash having a mechanical input, a mechanical output, and a first concentric ring gear and a second concentric ring gear. The gear system may include a first elastic element in series between the first concentric ring gear and the mechanical output, such that the first elastic element may be tensioned to bias the first concentric gear in a first direction. The gear system may also include a second elastic element connected in series between the second concentric ring gear and the mechanical output, such that the second elastic element may be tensioned to bias the second concentric ring gear in a second direction opposite from the first direction.

In various embodiments, the first concentric ring gear may be disposed adjacent to the second concentric ring gear. The gear system includes a stationary center ring gear disposed between the first concentric ring gear and the second concentric ring gear; the stationary center ring gear may be fixed in position. The diameter of the stationary center ring gear may be larger than the diameters of the second concentric ring gear and the first concentric ring gear. Each of the elastic elements may be a torsion spring or a linear spring. The gear system may, for example, be in at least one stage of a multi-stage planetary gearbox, or may be in the final stage of a multi-stage planetary gearbox; for example, the gear ratio of the final stage may be 23:1. The system may also include a force transducer positioned between the mechanical input and the mechanical output for generating a force signal indicating forces applied by one or all of the elastic elements. An active-feedback force controller may be connected between the force transducer and the mechanical input for controlling the mechanical input. Based on the force signal, the active-feedback force controller may deflect the elastic element by an amount that produces a desired output force.

In another aspect, the invention relates to an apparatus for reducing backlash in a system with two separate mechanical couplers originating from a single mechanical input and connecting to a mechanical output. The apparatus may include a pair of elastic elements in series with the mechanical couplers to bias the couplers against one another.

In still another aspect, the invention relates to a method of reducing backlash in two mechanical couplers originating from a single mechanical input and connecting to a mechanical output. The method may include utilizing elastic elements to bias the separate mechanical couplers in opposite directions.

In various embodiments, the method may also include separating the mechanical couplers before biasing, in which biasing may occur at a single mechanical stage or in multiple stages of a multi-stage gearbox.

BRIEF DESCRIPTION OF THE FIGURES

Other features and advantages of the present invention, as well as the invention itself, can be more fully understood from the following description of the various embodiments, when read together with the accompanying drawings, in which.

DETAILED DESCRIPTION

Figure 1:
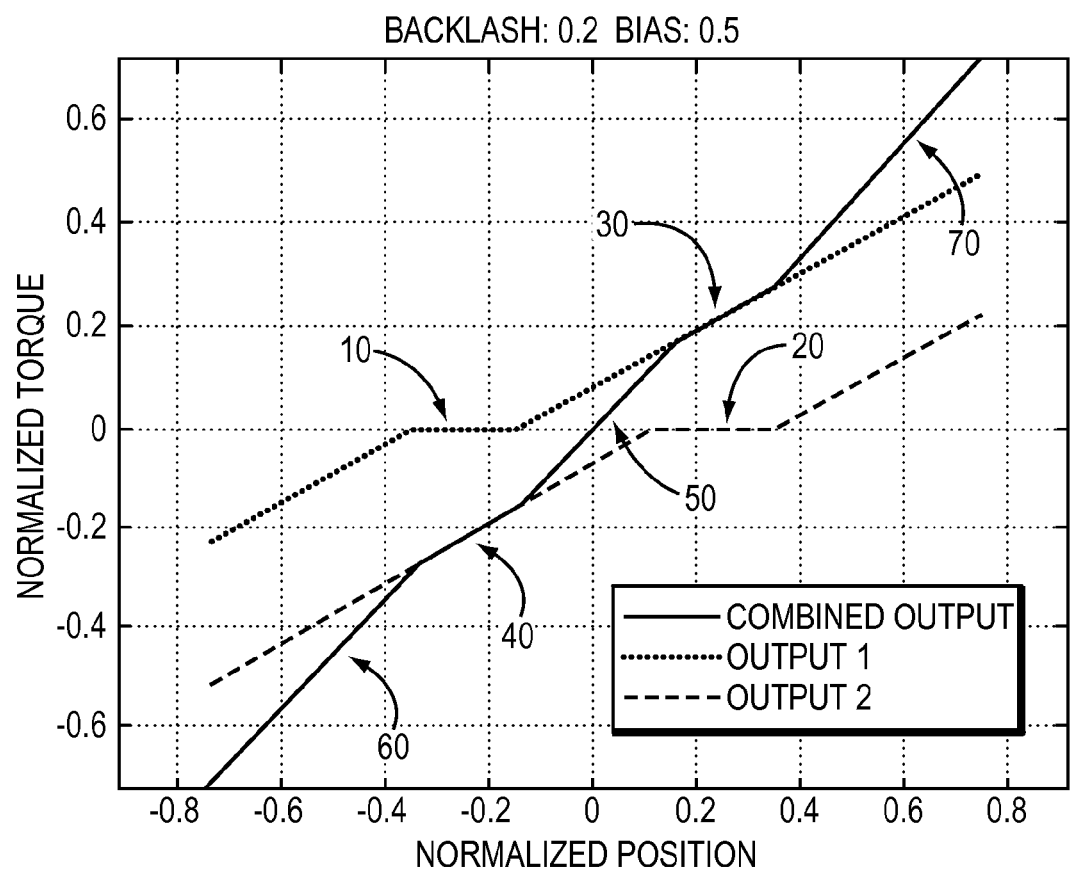
FIG. 1 is a graph illustrating the torque output of a speed-reduction system for a range of output positions and a fixed input position, in accordance with one embodiment of the invention.

Generally, as discussed hereinabove, embodiments of the invention reduce or minimize backlash by utilizing elastic elements to bias two separate mechanical couplers, which come from a single mechanical input, against one another. As used herein, the term "coupler" refers to any mechanical structure that links together other mechanical components; couplers include, for example, gears, belts, and trains. Couplers can transmit torque and velocity and, where appropriate, input into the coupler can be different from the coupler's output. For example, the velocity input into a coupler can be different than the velocity output. Examples of elastic elements include a linear spring, a torsion spring, an extension spring, and a compression spring.

By including the elastic element as an integral part of the gear system, and viewing backlash in terms of system stiffness, system backlash can be addressed. In accordance herewith, a gear system can be split into two gear subsystems which have the same gear ratio and operate in parallel, each independently interfacing the input and output and each with at least one elastic element (e.g., a spring) included as a serial connection between the respective gear subsystem and output. By separating the equilibrium positions of the subsystems by a larger amount than the free play due to backlash, backlash between the input and output is removed. This separation seen through the springs is referred to as the bias.

Since the system is acting through an elastic element, any backlash would present as an equilibrium band (a range of positions corresponding to zero stiffness) rather than an equilibrium point (a single position corresponding to zero force). By superimposing the two outputs and sufficiently biasing them, the equilibrium bands of the subsystems do not overlap; the zero stiffness region of one output coincides with the linear region of the other output. The outcome is a gear system that exhibits a full stiffness when both gear subsystems are engaged and partial stiffness when either of the gear subsystems are traversing their backlash regions, but no regions of zero stiffness.

In contrast to conventional arrangements, in which an anti-backlash gear has one of its two concentric gears rigidly attached to the shaft and the other coupled through a spring, in the present approach (in embodiments involving a pair of concentric gears), neither of the concentric gears is rigidly attached to the shaft; instead, both are coupled to the output through the spring. This approach is substantially elastic, according to the stiffness of the springs, whereas a conventional anti-backlash gear is completely rigid, anchored between the rigid gear and the preloaded spring. The present approach further deviates from conventional arrangements when generalizing to more than a single gear interface. In order to prevent backlash for conventional arrangements, one anti-backlash gear is used in each stage. In the present approach, standard gears may be used for each stage, with at least one elastic element connected in series to each gear subsystem.

In a multi-stage gear system utilizing the present approach, the split into two subsystems with at least one elastic element connected in series to each subsystem can be used in as few as one or as many as all of the stages, depending on performance requirements and cost considerations. In the same way that a gear reduction reduces the motion of the larger gear compared to the smaller gear, any free play input to the small gear is reduced proportionally to the reduction. Conversely, any free play input to the large gear is magnified through the gearing. As such, one efficient placement of the split from the perspective of free motion would be at the low-motion/high torque end of the gear system; however, the split can be placed elsewhere, according to the specific needs of the application, and the elastic elements can be placed anywhere in the split. Additionally, each elastic element can form a part of a series elastic actuator, which is described in U.S. Pat. No. 5,650,704 to Pratt et al., the entire disclosure of which is hereby incorporated by reference. In this configuration, at least one force transducer is positioned between the mechanical input and the mechanical output. The force transducer may generate a signal that indicates or correlates to forces applied by an elastic element, e.g., either of the elastic elements in each gear subsystem. Alternatively, the force transducer can generate a signal that indicates or correlates to forces applied by all of the elastic elements for the gear subsystems. The configuration can also include at least one active-feedback force controller connected between the force transducer and the mechanical input. Based on the force signal, the active-feedback force controller controls the mechanical input to deflect at least one of the elastic elements or all of the elastic elements for the gear subsystems by an amount that produces a desired output force. The produced output force is substantially independent of the output motion or the motion of a load connected to the mechanical output. This configuration provides force generation and control directly through the elastic element, which supports the mechanical output.

In one implementation, four stages of spur gears are employed, so that the split may be achieved at a variety of stages. Two identical gear trains are laid side-by-side. A motor drives the primary chain, and affordances are left for a pair of spur gears to couple the motion of the second spur chain at any point in the gear train. Since the coupling occurs through a set of gears, the secondary chain has an extra pair of connections, and therefore a larger amount of backlash.

In another implementation, the split occurs at the final stage. In this configuration, a planetary differential gearbox is used, but instead of a single ring-gear output, a pair of ring gears are used. Due to the relatively large gear ratio associated with the final stage (e.g., 23-to-1), backlash in the previous stages is attenuated by over an order of magnitude, with a minimal part-count increase.

FIG. 1 illustrates the torque output of an embodiment of the invention which uses linear springs of equal value and each independent reduction experiences the same amount of backlash. The flat regions 10, 20 indicate regions of zero stiffness due to the backlash of the individual reductions. Regions 30, 40 indicate reduced stiffness due to engagement of only a single gear tooth. Region 50 indicates full stiffness where the gear teeth of both gear sub-systems are engaged in opposing directions. Regions 60, 70 indicate full stiffness where the gear teeth of both gear sub-systems are engaged in a uniform direction.

Figure 2:
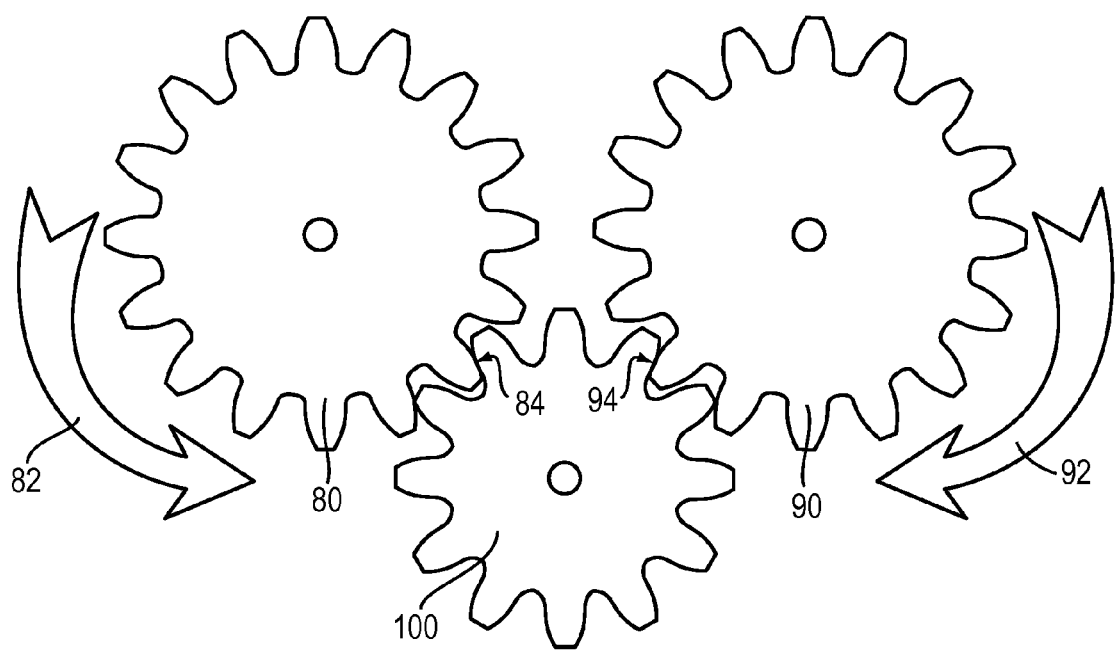
FIG. 2 is a schematic, partial top view of gear tooth interactions for one state of a speed-reduction system, according to an embodiment of the invention.
Figure 3:
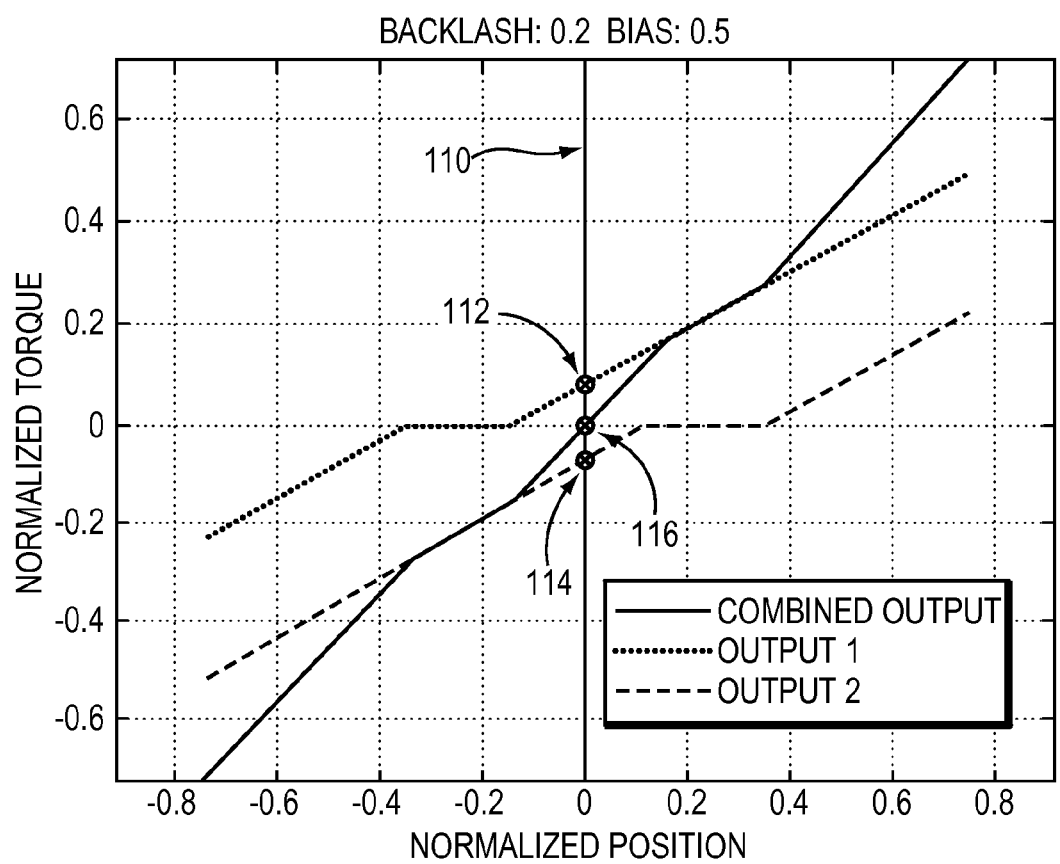
FIG. 3 is a graph detailing the torque output of the state of the speed-reduction system of FIG. 2.

FIGS. 2 and 3 depict a portion of a speed-reduction gear system in an equilibrium configuration and associated torque output data therefor. A final gear of a first gear sub-system 80 and a final gear of a second gear sub-system 90 connect and mate with an output gear 100. The directions of torques 82, 92 of gear sub-systems 80, 90, respectively, acting upon output gear 100, are caused by the biased equilibrium positions of the associated elastic elements (not shown). The position of the output is depicted by a vertical line 110, as well as the magnitudes of the torques 112, 114 of the respective gear subsystems. Since the system is in equilibrium, the combined magnitudes 116 of the torques from the gear sub-systems 80, 90 are identical. Meshes 84, 94 of the gear sub-systems 80, 90 are maintained.

Figure 4:
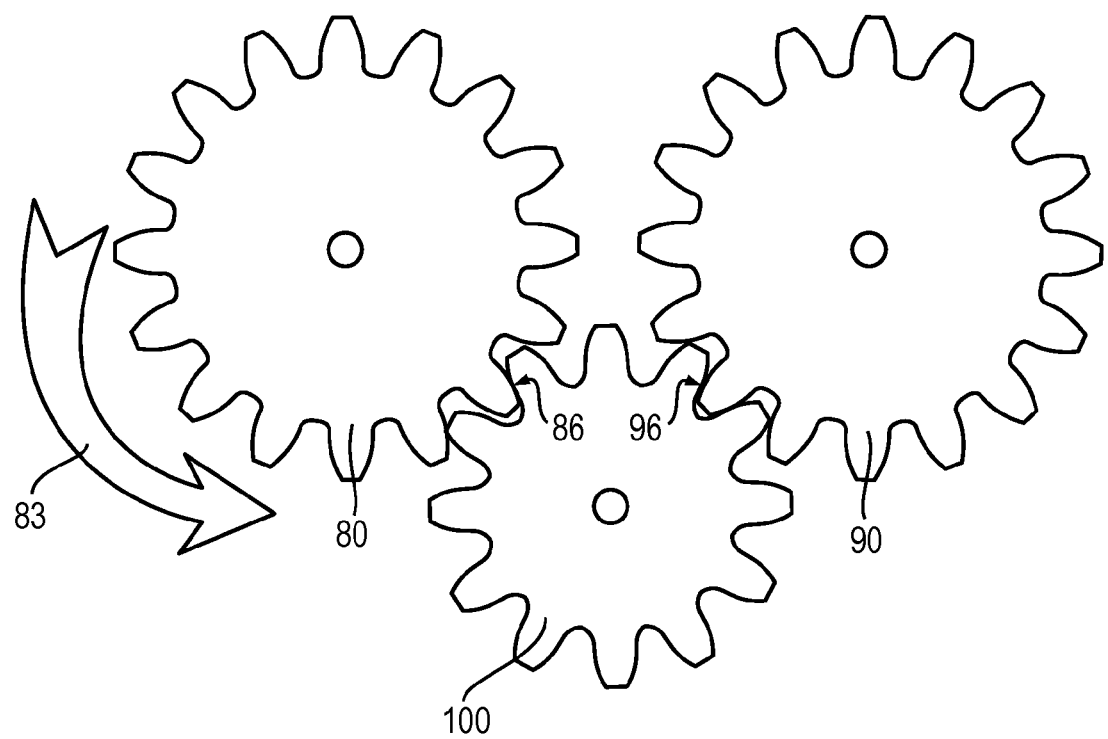
FIG. 4 is a schematic, partial top view of gear tooth interactions for another state of a speed-reduction system, in accordance with an embodiment of the invention.
Figure 5:
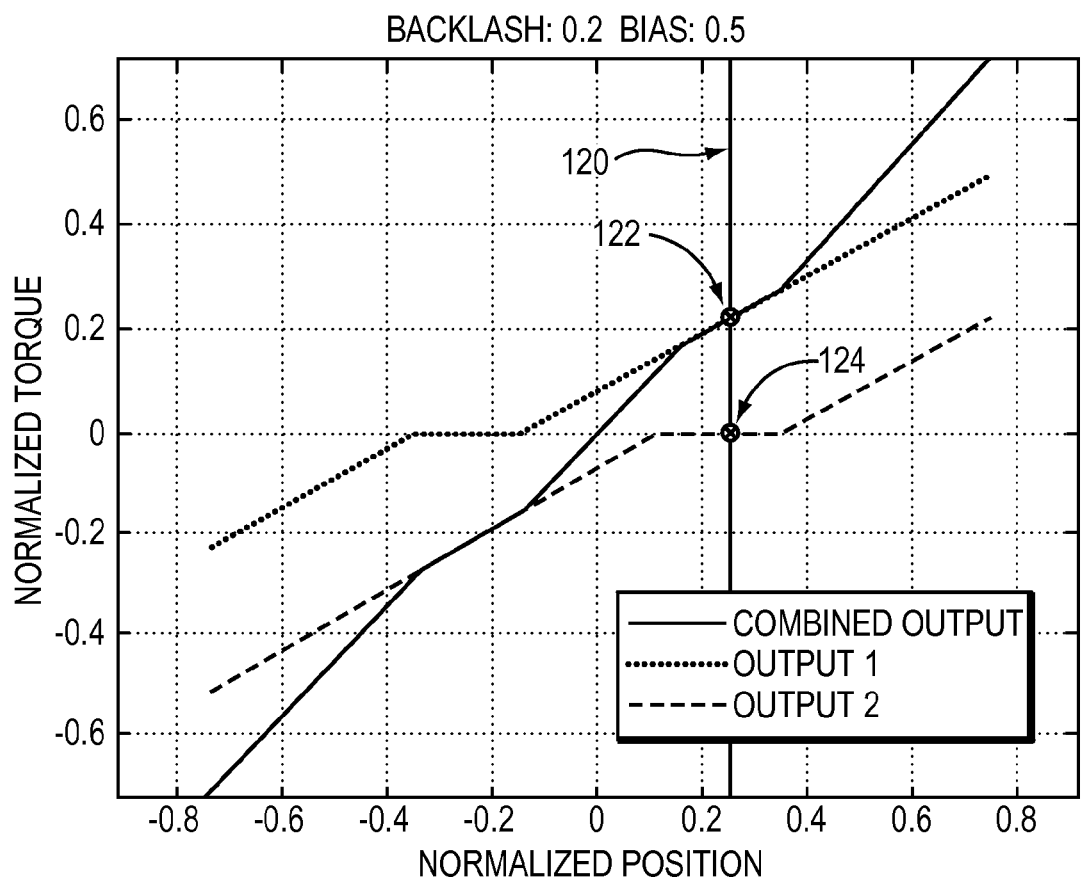
FIG. 5 is a graph illustrating the torque output of the state of the speed-reduction system of FIG. 4.

FIGS. 4 and 5 depict the speed-reduction system in a state where one gear is out of mesh, as well as associated torque output data therefor. In this state, the direction 83 of torque of the gear sub-system 80 indicates torque on the output gear 100, and since gear sub-system 90 is out of mesh, there is no direction of torque on gear sub-system 90 and therefore torque is not delivered to the output gear 100. The position 120 of the output gear 100 is shifted because the gear subsystem 90 is out of mesh. Similarly, the magnitudes 122, 124 of the torques from the gear sub-systems 80, 90 are also shifted. Since the magnitude 124 of the gear sub-system 90 indicates a zero torque level, the system torque is about equal to the magnitude 122 of the torque from the gear sub-system 80. Mating teeth 86 of the first gear sub-system 80 are in mesh with the teeth of the output gear 100, while teeth 96 of the second gear sub-system 90 are out of mesh with the teeth of the output gear 100.

Figure 6:
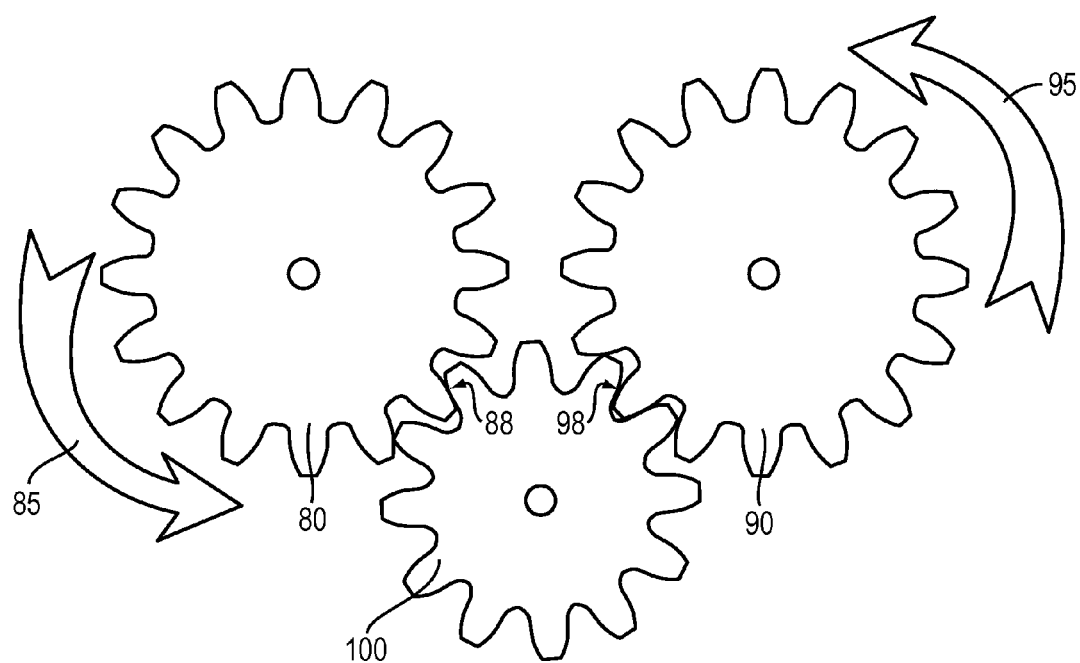
FIG. 6 is a schematic, partial top view of gear tooth interactions for another state of a speed-reduction system, according to an embodiment of the invention.
Figure 7:
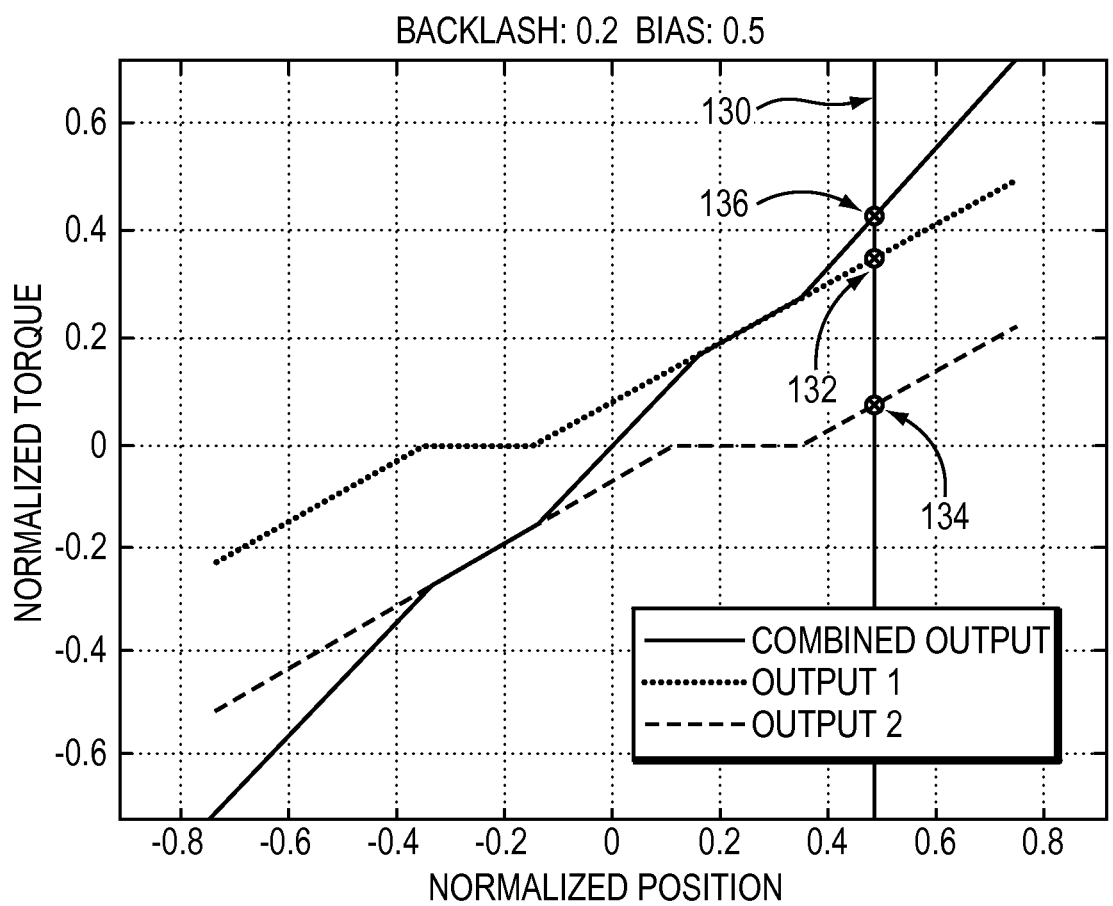
FIG. 7 is a graph illustrating the torque output of the state of the speed-reduction system of FIG. 6.

FIGS. 6 and 7 depict the speed-reduction system in a state where the torque of the speed-reduction system is larger than the bias torque used to remove backlash, as well as associated torque data therefor. In this state, the directions 85, 95 of torque of gear sub-systems 80, 90, respectively, indicate the direction of torque acting upon output gear 100. The torques of both gear sub-systems 80, 90 are in the same direction, but the magnitudes 132, 134 of the gear sub-systems 80, 90 differ by the magnitude of the torque bias. Similarly, the position 130 of the output gear 100 is shifted, as well as the combined magnitudes 136 of the torques of the gear sub-systems 80, 90.

These three states represent three possible states of the speed-reduction system. In all of these states, a non-zero stiffness is maintained, which lends to improvement in minimizing backlash as compared to a system which includes non-zero stiffnesses.

Figure 8:
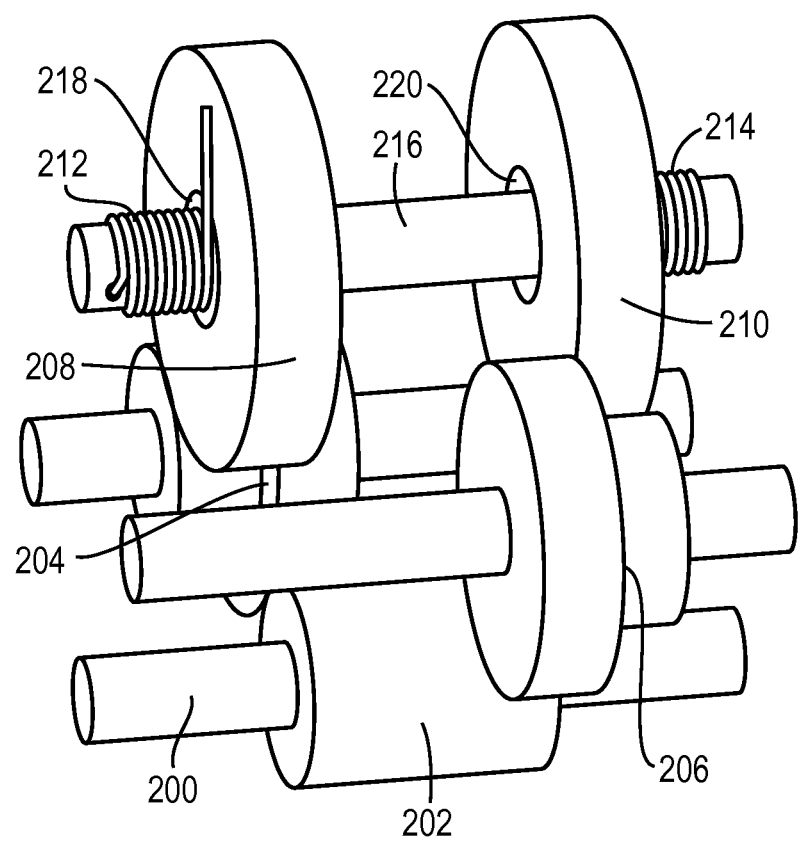
FIG. 8 is a schematic perspective view of a gearbox according to one embodiment of the invention.

FIG. 8 depicts an embodiment of the speed-reduction system using a two-stage spur gear reduction. Input mechanical shaft 200 is coupled to an input gear 202. The teeth (not shown) of compound gears 204, 206, corresponding to first and second gear sub-systems, respectively, mate with the teeth (not shown) of the input gear 202. The teeth of compound gears 208, 210, corresponding to third and fourth gear sub-systems, respectively, mate with the teeth of compound gears 204, 206. Springs 212, 214 are connected in series between the compound gears 208, 210 of the final stage, respectively, and the output shaft 216. In this configuration, spaces 218, 220 illustrate that compound gears 208, 210 do not directly engage the output shaft 216, but instead act, respectively, through springs 212, 214.

Figure 9:
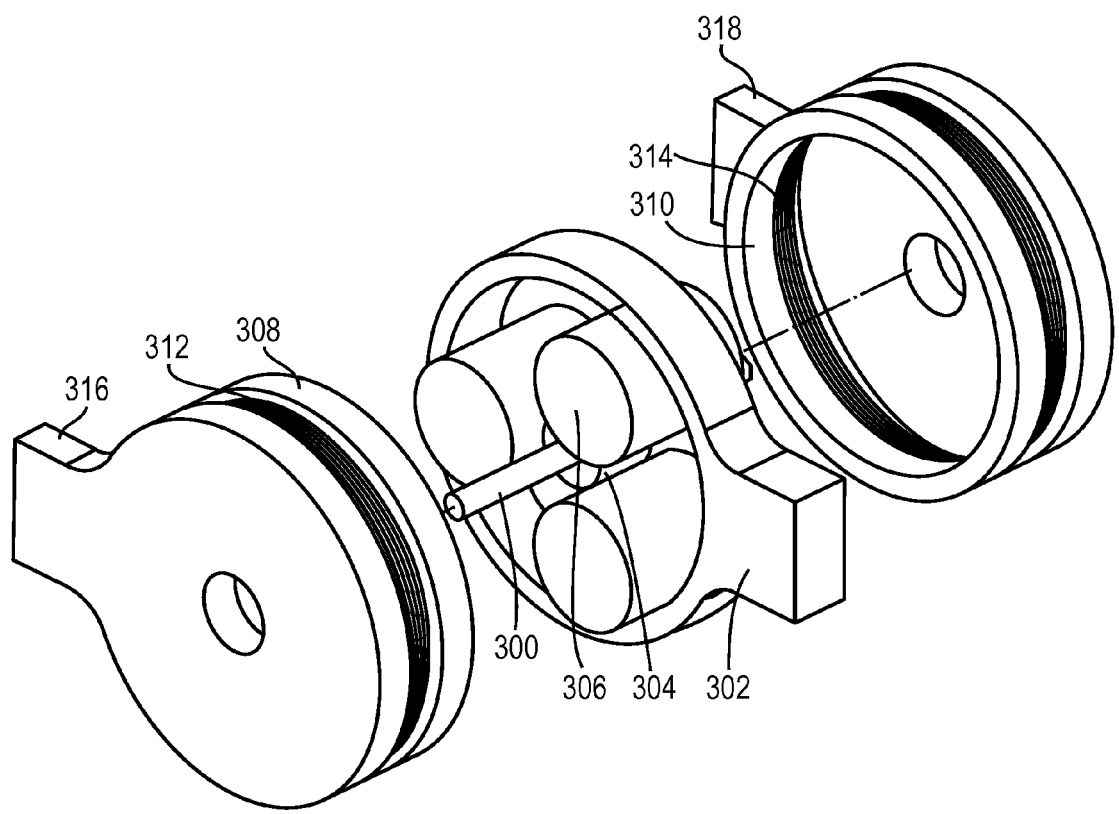
FIG. 9 is a schematic partially exploded view of a gearbox according to another embodiment of the invention.

FIG. 9 depicts an embodiment of the speed-reduction system using a planetary differential gearbox. The planetary differential gearbox includes an input shaft 300 and a fixed ring 302 disposed about the input shaft 300. A sun gear 304 and planetary gears 306 are disposed within the fixed ring 302 such that teeth (not shown) of the planetary gears 306 mate and correspond with teeth (not shown) on the inside of the fixed ring 302. Output ring gears 308, 310, corresponding to first and second gear sub-systems, also mate and correspond with the planetary gears 306. Elastic elements 312, 314 are connected in series between the respective output ring gears 308, 310 and outputs 316, 318 of the speed-reduction system. Outputs 316, 318 are rigidly attached and the elastic elements 312, 314 are sufficiently biased in opposing directions to minimize backlash.

One approach to reducing backlash, as depicted in FIG. 9, is to start with separate outputs (e.g., ring gears), but keeping common planets and suns. The gear ratio in the final stage can be, for example, 23:1. This means that any backlash between the planets and the sun is divided by a factor of 23. Even if the backlash between the sun and the planets were egregiously large, such as 6.5°, the output backlash would only be 0.005 radian. If the backlash from this configuration turns out to be excessive, an alternative embodiment having a common sun and separate planets may be employed. In this arrangement, the gear ratio of the separate systems can approach 150:1.

Example

Testing of an embodiment of the invention utilized five stages of spur gears instead of a three-stage planetary differential gearbox. Alternative testing utilized a dual-motor setup. The five-stage spur gears setup consisted of a 6.67:1 reduction followed by four 2.95:1 stages, for a total reduction of 503.1. By comparison, a 3-stage planetary differential setup starts with a 3.41:1 reduction in a spur chain followed by a 148.5:1 reduction in the planetary, for a total of 506.4. The final stage of the planetary (between the ring and planets) has a reduction of 23:1. The final three stages of the spur chain had a reduction of 25.6:1. The gear ratios described in this paragraph are shown in Tables 1 and 2.

TABLE 1

Spur Mockup

| Stage 1 | Stage 2 | Stage 3 | Stage 4 | Stage 5 |
|---|---|---|---|---|
| 6.57:1 | 2.95:1 | 2.95:1 | 2.95:1 | 2.95:1 |
| 6.67:1 | 19.6:1 | 57.9:1 | 170.7:1 | 503:1 |
| 503:1 | 75.5:1 | 25.6:1 | 8.68:1 | 2.95:1 |

TABLE 2

Planetary Differential

| Stage 1 | Stage 2 | Stage 3 |
|---|---|---|
| 3.41:1 | 6.46:1 | 23:1 |
| 3.41:1 | 22:1 | 506:1 |
| 506.4:1 | 148.5:1 | 23:1 |

The stages in Tables 1 and 2 highlighted roughly equivalent output stages. Since the planetary differential setup has a larger gear ratio, it took three stages of spur gears to achieve the same ratio. The spur setup was built with a position sensor on the motor, as well as Hall Effect sensors on the two mechanical outputs and mounting points for both a load cell and a position sensor, depending on the test style utilized.

Figure 10:
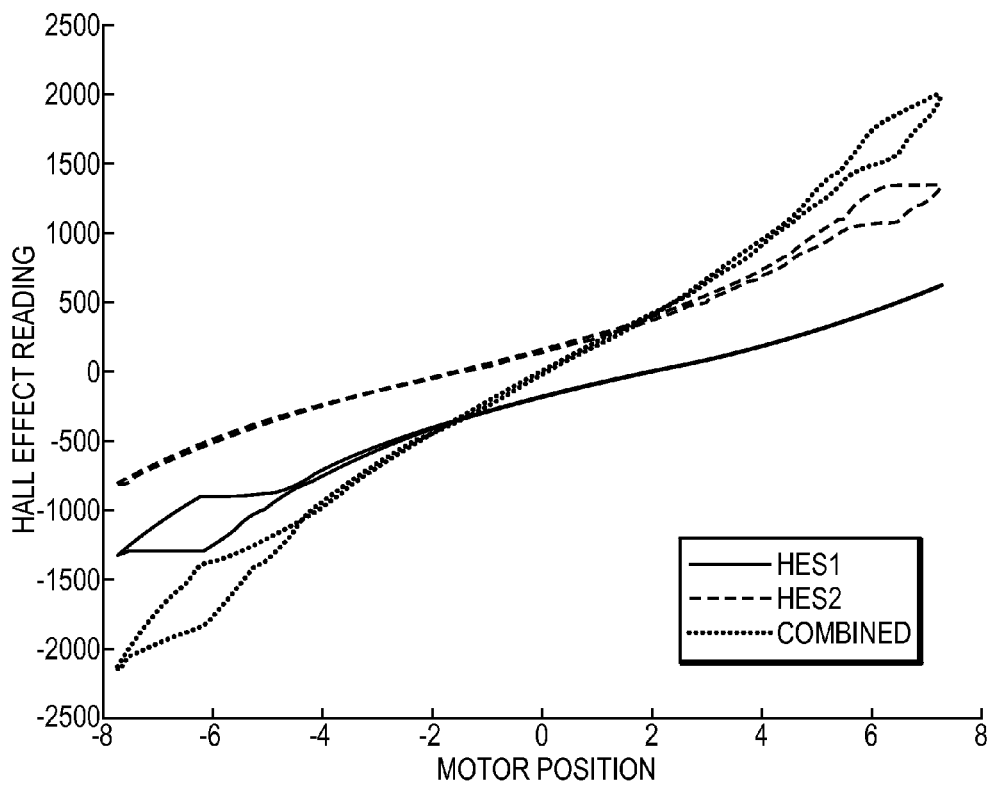
FIG. 10 is a graph illustrating the Hall Effect sensor readings of the state of the motor position of a dual motor embodiment of a gearbox.

Referring to FIG. 10, the first test was a comparison between motor position and output torque. In a standard backlash-free system, any change in motor position corresponds to a change in output position. Since the test configurations had series elastic actuators, any change in motor position would correspond to a change in output torque. The setup was run with two mechanical outputs and a single mechanical output, to compare the torque versus motor position curves. Sensor readings were taken from both the Hall Effect sensors (measuring the relative displacement) and an external load cell. The load cell readings were transmitted in analog form and are, therefore, much noisier than the Hall Effect readings.

The data in FIG. 10 shows the Hall Effect sensor data taken from the experimental setup with dual motors. Each of the individual sensors demonstrated backlash. The sum, however, demonstrated a change in stiffness, but never had zero stiffness.

Figure 11:
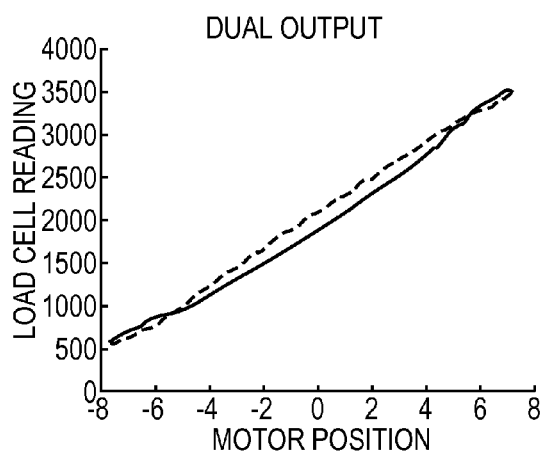
FIGS. 11 and 12 are graphs illustrating sensor measurements of the state of the motor position of a dual motor embodiment of a gearbox.
Figure 12:
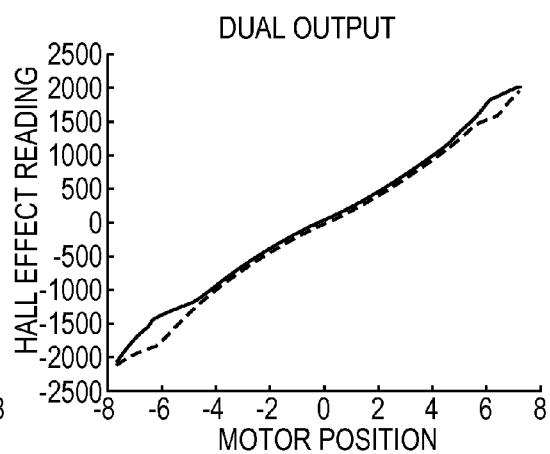
Figures 13, 14:
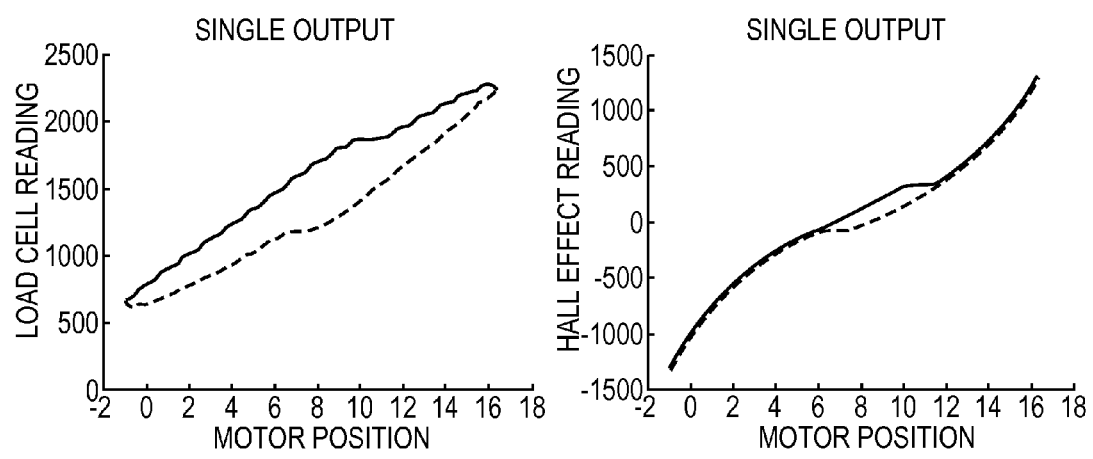
FIGS. 13 and 14 are graphs illustrating sensor measurements of the state of the motor position of a single motor embodiment of a gearbox.

The data from the load cell were put through a low-pass filter. The data from the Hall Effect sensors were left unmodified. The data in each of FIGS. 11 through 14 are taken from the same experiment, with FIGS. 11 and 12 showing data for dual motors and FIGS. 13 and 14 showing data for a single motor. The force data, shown in FIGS. 11 and 13, appears to be shifted through a hysteresis likely caused by static friction.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A system for reducing backlash, comprising:
    a mechanical input;
    a mechanical output;
    first and second mechanical couplers operatively connected to the mechanical input and the mechanical output, the first mechanical coupler being separate from the second mechanical coupler;
    at least one first elastic element connected in series between the first mechanical coupler and the mechanical output to bias the first mechanical coupler in a first direction; and
    at least one second elastic element connected in series between the second mechanical coupler and the mechanical output to bias the second mechanical coupler in a second direction, the second direction being opposite from the first direction.

2. The system of claim 1, wherein the first mechanical coupler is disposed adjacent to the second mechanical coupler.

3. The system of claim 1, wherein the first mechanical coupler and the second mechanical coupler are gears in at least one stage of a multi-stage gearbox.

4. The system of claim 1, wherein the first mechanical coupler and the second mechanical coupler are ring gears in at least one stage of a multi-stage planetary gearbox.

5. The system of claim 4, wherein the first mechanical coupler and the second mechanical coupler are rings gears in a final stage of the multi-stage planetary gearbox.

6. The system of claim 5, wherein a gear ratio of the final stage is 23:1.

7. The system of claim 5 further comprising a stationary center gear disposed between the first mechanical coupler and the second mechanical coupler, wherein the stationary center gear is fixed in position.

8. The system of claim 1, wherein each of the at least one first elastic element and the at least one second elastic element comprises at least one of a torsion spring or a linear spring.

9. The system of claim 1 further comprising:
    a force transducer positioned between the mechanical input and the mechanical output, the force transducer generating a force signal indicating forces applied by the at least one first elastic element or the at least one second elastic element; and
    an active-feedback force controller connected between the force transducer and the mechanical input for controlling the mechanical input, based on the force signal, to deflect the at least one first elastic element or the at least one second elastic element an amount that produces a desired output force.

10. A gear system for reducing backlash, comprising:
    a mechanical input;
    a mechanical output;

first and second concentric ring gears operatively connected to the mechanical input and the mechanical output, the first concentric ring gear being separate from the second concentric ring gear;

at least one first elastic element in series between the first concentric ring gear and the mechanical output, the at least one first elastic element tensioned to bias the first concentric ring gear in a first direction; and at least one second elastic element in series between the second concentric ring gear and the mechanical output, the at least one second elastic element tensioned to bias the second concentric ring gear in a second direction opposite from the first direction.

11. The gear system of claim 10, wherein the first concentric ring gear is disposed adjacent to the second concentric ring gear.

12. The gear system of claim 10 further comprising a stationary center ring gear disposed between the first concentric ring gear and the second concentric ring gear, wherein the stationary center ring gear is fixed in position.

13. The gear system of claim 12, wherein a diameter of the stationary center ring gear is larger than a diameter of the second concentric ring gear and a diameter of the first concentric ring gear.

14. The gear system of claim 10, wherein each of the at least one first elastic element and the at least one second elastic element comprises at least one of a torsion spring or a linear spring.

15. The gear system of claim 10, wherein the gear system is in at least one stage of a multi-stage planetary gearbox.

16. The gear system of claim 15, wherein the gear system is in the final stage of a multi-stage planetary gearbox.

17. The gear system of claim 16, wherein a gear ratio of the final stage is 23:1.

18. The gear system of claim 10 further comprising:

a force transducer positioned between the mechanical input and the mechanical output, the force transducer generating a force signal indicating forces applied by the at least one first elastic element or the at least one second elastic element; and an active-feedback force controller connected between the force transducer and the mechanical input for controlling the mechanical input, based on the force signal, to deflect the at least one first elastic element or the at least one second elastic element an amount that produces a desired output force.

* * * * *